United States Patent

Nilsson

[15] 3,659,435
[45] May 2, 1972

[54] TORQUE TRANSFERRING DEVICE

[72] Inventor: Sven Walter Nilsson, Savedalen, Sweden
[73] Assignee: SKF Industrial Trading and Development Company N.V., Amsterdam, Netherlands
[22] Filed: May 7, 1970
[21] Appl. No.: 35,456

[30] Foreign Application Priority Data

May 9, 1969 Sweden..................................6573/69

[52] U.S. Cl.............................................................64/23.7
[51] Int. Cl..........................................................F16d 3/06
[58] Field of Search............................................64/23, 23.7

[56] References Cited

UNITED STATES PATENTS

| 3,304,745 | 2/1967 | King et al...................................64/23 |
| 851,728 | 4/1907 | Bayrer.......................................64/23.7 |
| 3,045,457 | 7/1962 | Blanchard et al..........................64/23.7 |
| 2,945,366 | 7/1960 | Sears.........................................64/23.7 |

FOREIGN PATENTS OR APPLICATIONS

955,913  4/1964  Great Britain............................64/23

*Primary Examiner*—Edward G. Favors
*Attorney*—Howson and Howson

[57] ABSTRACT

A device for transferring a torque may comprise an outer tubular component enclosing a shaft, the diameter of which is only slightly less than the cylindrical, internal surface of the outer component. These two components cooperate through the intermediation of balls operating in parallel, matching grooves in the two components.

To ensure a recirculation of the balls in unloaded condition and to ensure a smooth running of the balls, the grooves are arranged in at least three pairs in which two grooves on opposite sides of a ridge in the inner component will cooperate with two grooves arranged at opposite sides of a groove in the outer member to form two runways, which are each connected to a return passage in the outer component.

2 Claims, 5 Drawing Figures

PATENTED MAY 2 1972

INVENTOR:
SVEN WALTER NILSSON
BY Howson & Howson
ATTYS.

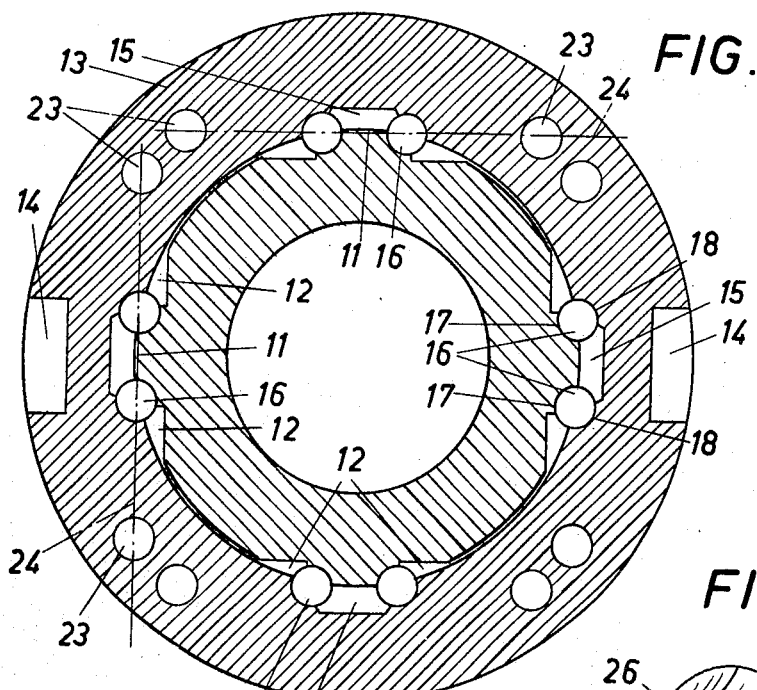
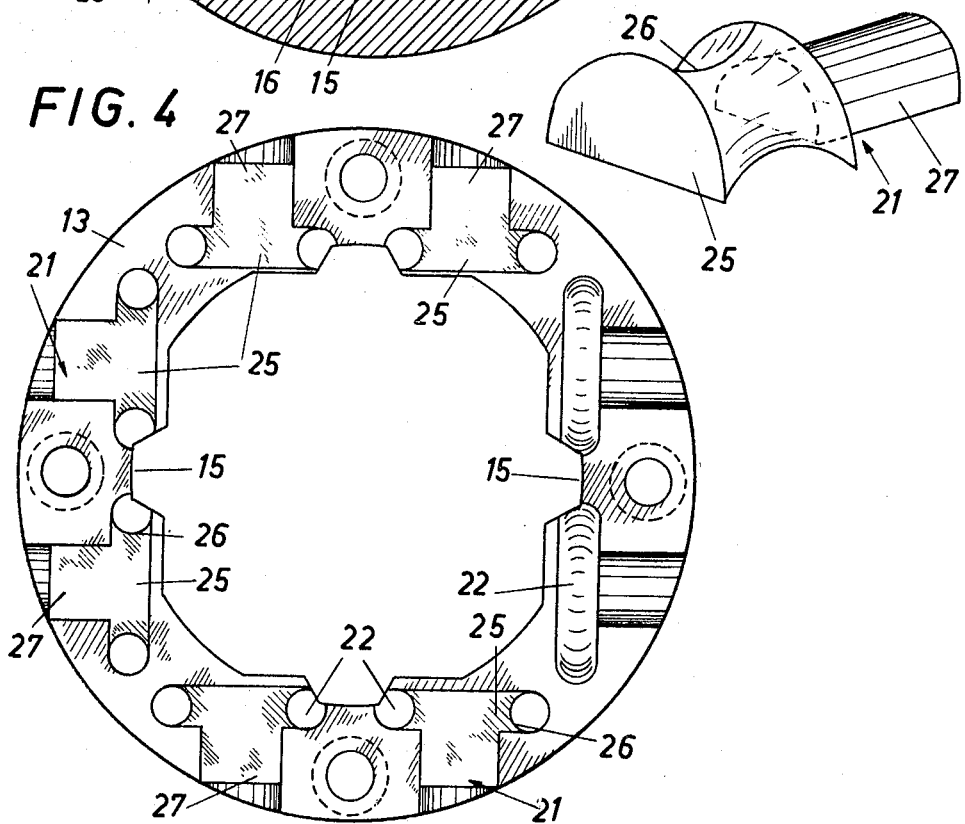

1

TORQUE TRANSFERRING DEVICE

BACKGROUND OF THE INVENTION

The present invention refers to a device adapted to transfer a torque between two components which are axially displaceable in relation to each other through the intermediation of balls operating in axially extending grooves in the components. The aim of the invention is to provide a device which makes possible a re-circulation of the balls without any load being imposed thereon, and furthermore to arrange the runways for the balls with bends having appropriate radii to ensure a smooth running of the balls. By a slight increase of the ball diameter above the nominal value of the groove it will furthermore be possible to maintain the desired clearance within the unit.

SUMMARY OF THE INVENTION

According to the invention one of the components, which is tubular and encloses the other component, is inwardly defined by a substantially cylindrical surface, which the other component is defined by a substantially cylindrical external surface having slightly smaller diameter than the internal surface of the outer component. Each component is provided with at least three pairs of grooves running in parallel and having a cross section forming part of a circular arc. Each pair of grooves in the internal component is located to fit in between the grooves at a juxtaposed pair of grooves in the outer component, in such a manner that the lines defining the cross sections of one groove in the outer member and one groove in the internal member will form part of a common circle, the outer member being provided with bores and passages to bring about a continuous re-circulation of the balls.

One embodiment of the invention will below be described with reference to the accompanying drawings as utilized in a device where a tubular body is mounted on a shaft, and is designed to transfer a torque to the latter, or where reversely, the shaft may transfer a torque to the tubular member, while simultaneously an axial displacement of the tubular member in relation to the shaft may take place.

BRIEF DESCRIPTION OF THE DRAWINGS

FIG. 3 shows a cross section taken along line III—III in FIG. 1;

FIG. 4 is a cross section taken along line IV—IV in FIG. 1; and

FIG. 5 shows a perspective view of a guiding member.

DESCRIPTION OF THE PREFERRED EMBODIMENT

Figure 1:
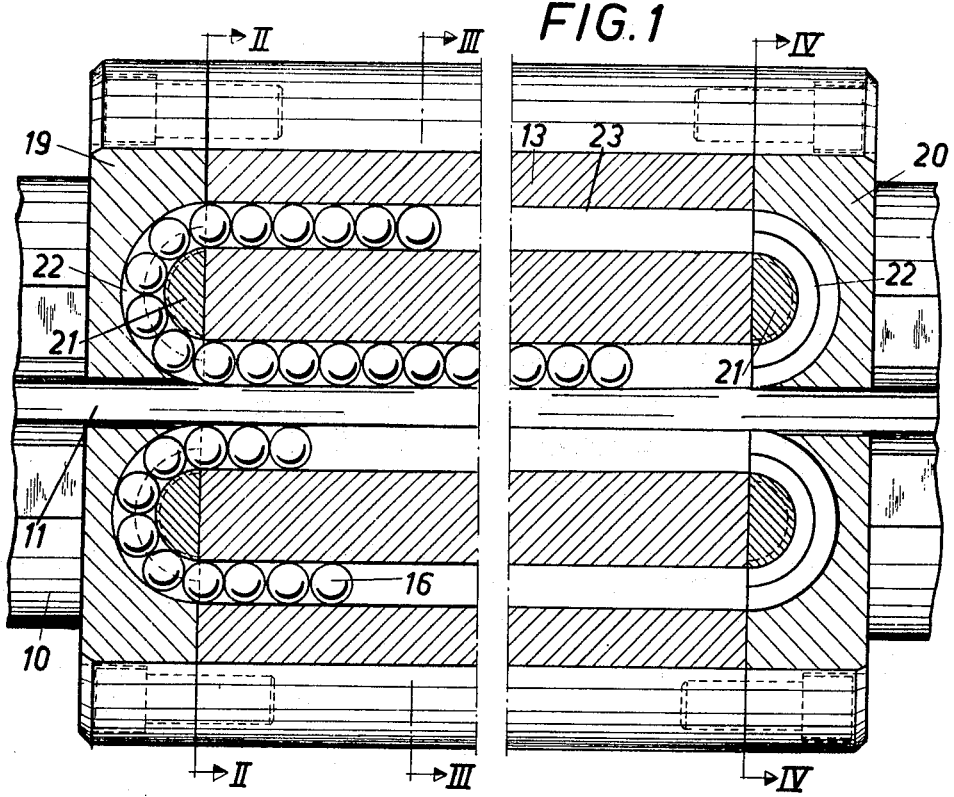
FIG. 1 shows a longitudinal section through the outer component taken along line I—I in FIG. 2.
Figure 2:
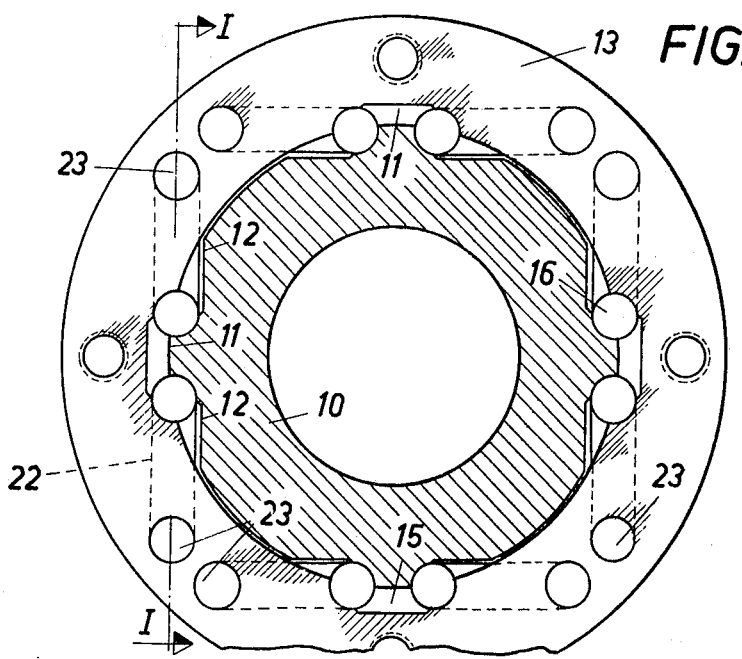
FIG. 2 is a cross section through the device taken along line II—II in FIG. 1.

The shaft is tubular and is generally denoted by 10. It has a general circular cross section, but in the body thereof four axially extending grooves 11 are formed spaced apart 90° by axially extending recesses 12 being milled from the body of the shaft. The outer tubular component is denoted by 13 and has a considerably shorter length than the shaft. The external surface of the outer component may have arbitrary shape, to make it suitable for fitting into a machine element. It is here shown cylindrical with two external recesses 14, which facilitate the desired connection to a certain type of machine elements. The internal surface of the component is also cylindrical, and in the same four axially extending grooves 15 are formed, space apart by 90°. These recesses are somewhat broader than the ridges 11 at the inner component, and it should be noted that the inner component is completely circumscribed by the outer component, in such a manner that a mechanical contact between the parts may be avoided.

The transfer of the torque is brought about by means of a number of balls 16 only, which are fitted into runways formed between the grooves in the components. Said runways comprising parts at the ridges 11 and in the recesses 15. To each side of a ridge there is thus an axially extending groove 17, having a cross section defined by a line forming about one quarter of a circle. In the corresponding manner there is at each side of the recess 15 a similar groove 18, which likewise is defined by a line forming about one quarter of a circle. These two quarter circles form parts of a common circle, which defines the runway into the balls are fitted.

By making the balls 16 slightly larger than this circle the desired clearance between the components of the device may be maintained. This adjustment of the clearance may also be brought about by dividing the outer component 13 into two or more parts, which may be adjusted in relation to each other. It is also possible to make axially extending slots in the component 13, and to force the parts separated by the slots towards each other by means of screws or the like in order to reduce the clearance.

A torque may thus be transferred between the two components by means of eight rows of balls, and during a relative axial displacement between the components it is necessary to provide a re-circulation of the balls from the rearmost end of the grooves to the forward ends, as counted, in the direction of movement. This re-circulation shall take place without the balls being subjected to any load during this part of the movement. The balls must in other words have a possibility freely to pass through the body of one of the components. FIG. 1 shows that the outer component 13, at each end is provided with a lid, 19 and 20, respectively. In these lids passages 22 are formed by means of guide members 21 being fitted into recesses. Each passage in the lids is connected to a runway composed of two grooves 17 and 18 and this passage is continued by an axially extending return bore 23 in the outer component. For each pair of runways 17, 18 there is such thus one return bore 23, and for the two runways, which are located to each side of a ridge 11, there will thus be two return bores 23. These are in the manner best shown in FIG. 3 arranged in a plane 24, which forms a tangent to the circle defining the plane of division between the two components 10 and 13. By this arrangement, the cross sectional thickness of the outer member 13 may be maintained at a minimum and still provide a desired radius of the transfer passage 22 to permit smooth circulation of the balls. Thus, the device of the present invention may be made more compactly as compared, for example, to devices wherein the ball return passage is located radially outwardly of the ball path between the members.

FIG. 5 shows a perspective view of a guiding member 21. This consists of a head 25, which is formed as a half cylinder provided with an external groove 26 corresponding to the shape of the ball. The member is provided with a shaft 27, which facilitates the mounting and locking thereof in the lid.

The drawings shows a device having four ridges. In order to obtain a satisfactory function three ridges must at least be provided, but depending upon the size of the device and the torque to be transferred, the number of ridges and runways may of course be increased above four.

What I claim is:

1. In a device for transferring a torque between inner and outer members which are axially displaceable in relation to each other through the intermediation of balls operating in juxtaposed, axially extending grooves in the members, the outer member being tubular and enclosing the inner member and having an inner substantially cylindrical surface, the inner member having a substantially cylindrical external surface of a slightly smaller diameter than the internal surface of the outer member to define an annular space therebetween, the improvement that each member is provided with at least three pairs of grooves running in parallel and having a cross section forming part of a circular arc, and where each pair of grooves in the inner member is located to fit in between the grooves at a juxtaposed pair in the outer member in such a manner that the lines defining the cross sections of one groove in the outer member and of one groove in the inner member will form part of a common circle defining a ball runway, said grooves of each pair in the outer member being located at opposite sides of a recess in said outer member and said grooves in the inner member being located at opposite sides of an axial ridge formed within the circular contour of the inner member by means of two axially extending recesses therein, the outer member being provided with axially extending recirculation bores and end passages interconnecting the ends of each recirculation bore with the ends of a corresponding ball runway to permit a continuous recirculation of the balls, the axes of the recirculation bores associated with the runways of each pair being disposed in a plane tangent to the annular space between the members.

2. A device as claimed in claim 1 including guide members forming the end passages of the recirculation bores, said guide members being fitted into recesses in lid parts at the outer axial ends of the outer member.

* * * * *